US 6,604,199 B1

(12) United States Patent
Yang et al.

(10) Patent No.: US 6,604,199 B1
(45) Date of Patent: Aug. 5, 2003

(54) POWER SUPPLY OF DOCKING SYSTEM AND POWER FAILURE SAFE DOCKING SYSTEM

(75) Inventors: Sung-dong Yang, Suwon (KR); Kwan-ho Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/467,011

(22) Filed: Dec. 20, 1999

(30) Foreign Application Priority Data

Jan. 8, 1999 (KR) .................................................. 99-244

(51) Int. Cl.[7] .............................................. G06F 1/30
(52) U.S. Cl. ..................... 713/300; 713/300; 713/330; 713/340; 710/303; 710/304
(58) Field of Search ................. 713/300, 330, 713/340; 710/303, 304

(56) References Cited

U.S. PATENT DOCUMENTS

| 5,442,794 A | | 8/1995 | Wisor et al. | |
| 5,598,537 A | * | 1/1997 | Swanstrom et al. | 395/281 |
| 5,632,020 A | | 5/1997 | Gephardt et al. | |
| 5,802,379 A | | 9/1998 | Boatwright et al. | |
| 5,832,237 A | | 11/1998 | Lee | |
| 5,875,307 A | * | 2/1999 | Ma et al. | 395/281 |
| 5,889,964 A | * | 3/1999 | Cho et al. | 395/281 |
| 5,911,079 A | * | 6/1999 | Yang et al. | 395/750.01 |
| 5,949,974 A | | 9/1999 | Ewing et al. | |
| 5,973,419 A | | 10/1999 | Kruppa et al. | |
| 5,987,545 A | * | 11/1999 | Oh | 710/100 |
| 6,119,237 A | * | 9/2000 | Cho | 713/300 |

* cited by examiner

*Primary Examiner*—Thomas Lee
*Assistant Examiner*—Nitin C. Patel
(74) *Attorney, Agent, or Firm*—Robert E. Bushnell, Esq.

(57) ABSTRACT

A power supply of a docking system as an extension device of a notebook computer and a power failure safe docking system are disclosed. The power supply of the docking system used as an extension device of the notebook computer includes an AC-to-DC converter receiving an external AC power supply to convert the received AC power supply to a DC power supply, a docking interrupt switch generating a docking interrupt control signal, when no more power is supplied by the AC-to-DC converter or the notebook computer, or it is detected that docking connection of the notebook computer and the docking system is broken, an analog switch receiving power from the AC-to-DC converter, and stopping connection of a peripheral device controller of the notebook computer to one or more extension peripheral devices of the docking system in accordance with the docking interrupt control signal, and a docking power supply control switch cutting off power of the AC-to-DC converter supplied to the one or more extension peripheral devices. Thus, in a docking system having an AC power supply different from a power supply supplied to the notebook computer, even when a power failure occurs or docking of the notebook computer and the docking system is released, the notebook computer or the docking system is not damaged.

16 Claims, 10 Drawing Sheets

POWER SUPPLY OF DOCKING SYSTEM AND POWER FAILURE SAFE DOCKING SYSTEM

CLAIM OF PRIORITY

This application makes reference to, incorporates the same herein, and claims all benefits accruing under 35 U.S.C. §119 from an application for Power Supply Of Docking System And Power Failure Safe Docking System earlier filed in the Korean Industrial Property Office on the Jan. 8 1999 and there duly assigned Serial No. 244/1999.

FIELD OF THE INVENTION

The present invention relates to a docking system as an extension device of a notebook computer, and more particularly, to a power supply of a docking system, and to a power failure safe docking system.

DESCRIPTION OF THE RELATED ART

Although notebook computers have the convenience of portability, it does not have all the functionality of a desktop computer. Thus, a docking system has been developed to provide extension apparatuses of a notebook computer such as an external monitor, a full-sized keyboard, speakers, a compact disk read only memory (CD-ROM) drive, a hard disk drive and port connectors. These peripherals of the docking station need to be protected in certain circumstances from power glitches that may destroy the peripherals if power is not disconnected first from these peripherals.

U.S. Pat. No 5,802,379 for a Battery Depletion Management in Portable Computing Devices Having PCMCIA Card Loading to Boatwright et al discloses a battery powered portable computer wherein when it is determined that the battery is being depleted, power is removed from expansion slots in said portable computer. However, Boatwright et al does not pertain to computers that can be docked to a docking station nor does Boatwright et al protect peripherals of a docking station. U.S. Pat. No. 5,632,020 for a System For Docking Portable Computer to a Host Computer Without Suspending Processor Operation by a Docking Agent Driving the Bus Inactive During Docking to Gephardt et al discloses inactivating the bus during docking. However, Gephardt et al does not disclose protecting peripherals stored within the docking station by interrupting power delivered to them or any other means. What is needed is a computer system that has both a docking station and a notebook computer wherein the peripherals of the docking station have power thereto interrupted whenever a situation arises which could jeopardize the peripherals in the docking station.

SUMMARY OF THE INVENTION

It is an object of the present invention to provide a power supply of a docking system which protects the docking system from power failures even when no more power is supplied to a docking system having a notebook computer docked thereto or the notebook computer is undocked from the docking system, and to a power failure safe docking system.

It is also an object to interrupt power to peripherals in a docking station whenever 1) a notebook computer is improperly inserted into a docking station or 2) whenever there is no power supplied to either directly to the docking station or from the notebook computer.

To achieve the above object, the power supply of a docking system used as an extension device of a notebook computer according to an embodiment of the present invention includes: an AC-to-DC converter receiving an external AC power supply to convert the received AC power supply to a DC power supply; a docking interrupt switch generating a docking interrupt control signal, when no more power is supplied by the AC-to-DC converter or the notebook computer, or it is detected that docking connection of the notebook computer and the docking system is broken; an analog switch receiving power from the AC-to-DC converter, and stopping connection of a peripheral device controller of the notebook computer to one or more extension peripheral devices of the docking system in accordance with the docking interrupt control signal; and a docking power supply control switch cutting off power of the AC-to-DC converter supplied to the one or more extension peripheral devices.

To achieve the above object, a docking system used as an extension device of a notebook computer according to an embodiment of the present invention includes: one or more extension peripheral devices; an AC-to-DC converter receiving an external AC power supply to convert the received AC power supply to a DC power supply; a docking interrupt switch generating a docking interrupt control signal when no more power is supplied by the AC-to-DC converter or the notebook computer, or it is detected that docking connection of the notebook computer and the docking system is broken; an analog switch receiving power from the AC-to-DC converter, and stopping connection of a peripheral equipment controller of the notebook computer and the one or more extension peripheral devices according to the docking interrupt control signal; a docking power supply control switch cutting of power of the AC-to-DC converter supplied to the one or more PCI devices according to the docking interrupt control signal; and a docking connector connecting or separating a power supply line receiving power from the notebook computer and a bus connecting a peripheral device controller and the notebook computer and the one or more extension peripheral devices.

To achieve the above object, a docking system used as an extension device of a notebook computer according to another embodiment of the present invention includes one or more extension peripheral devices; one or more input/output ports operated by receiving power from the notebook computer; an AC-to-DC converter receiving an external AC power supply to convert the received AC power supply to a DC power supply; a docking interrupt switch generating a docking interrupt control signal when no more power is supplied by the AC-to-DC converter or the notebook computer, or it is detected that docking connection of the notebook computer and the docking system is broken; an analog switch receiving power from the AC-to-DC converter, and stopping connection of a peripheral equipment controller of the notebook computer and the one or more extension peripheral devices according to the docking interrupt control signal; a docking power supply control switch cutting of power of the AC-to-DC converter supplied to the one or more PCI devices according to the docking interrupt control signal; and a docking connector connecting or separating a power supply line receiving power from the notebook computer, a bus connecting a peripheral equipment controller and the one or more extension peripheral devices, and lines connecting the input and output controller of the notebook computer and the one or more input and output ports.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
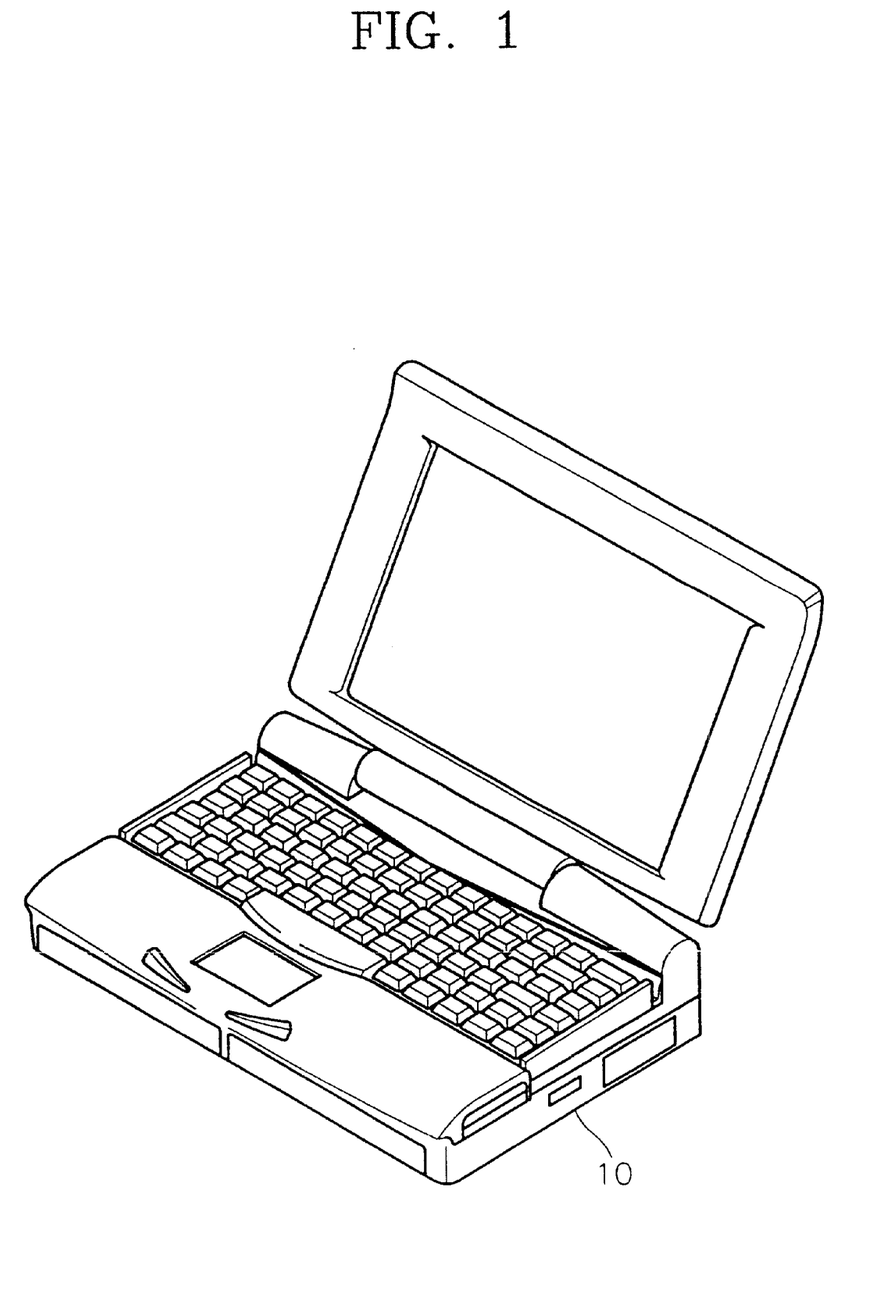
FIG. 1 is a perspective view of a typical notebook computer.
Figure 2:
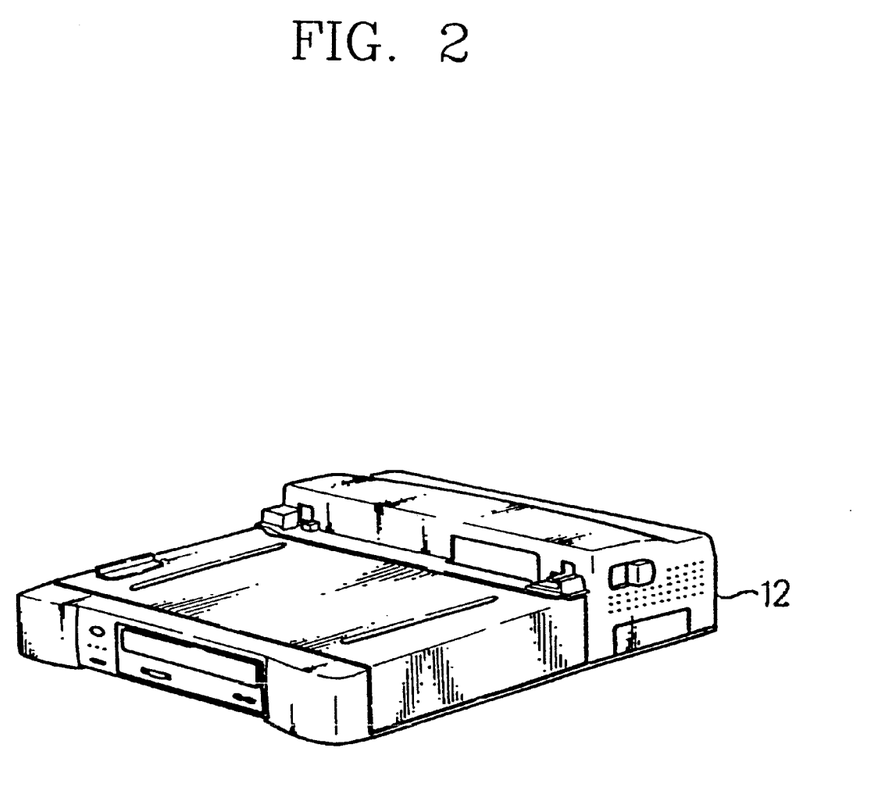
FIG. 2 is a perspective view of a typical docking system.
Figure 3A:
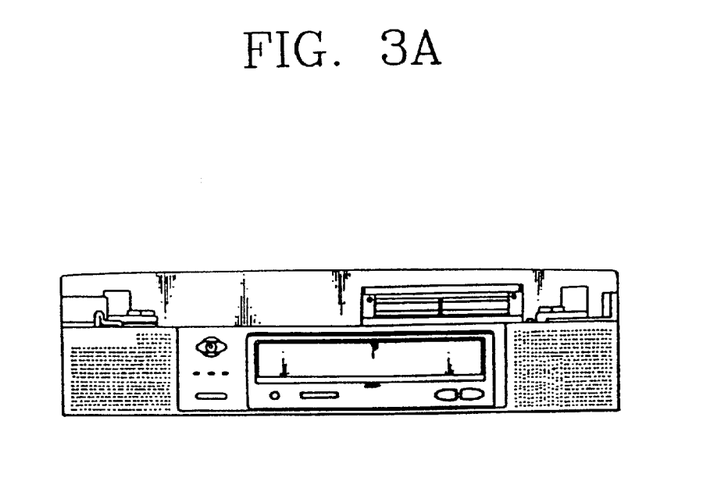
FIG. 3A is front view of the docking system of FIG. 2.
Figure 3B:
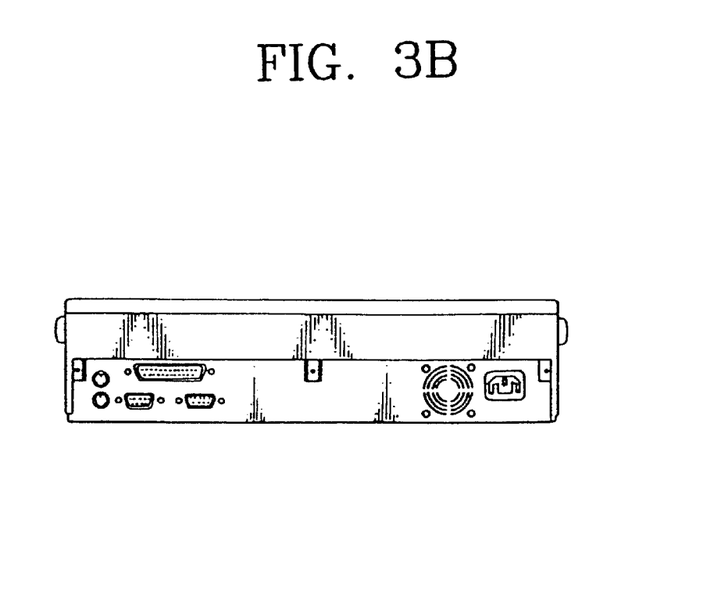
FIG. 3B is a rear view of the docking system of FIG. 2.
Figure 3C:
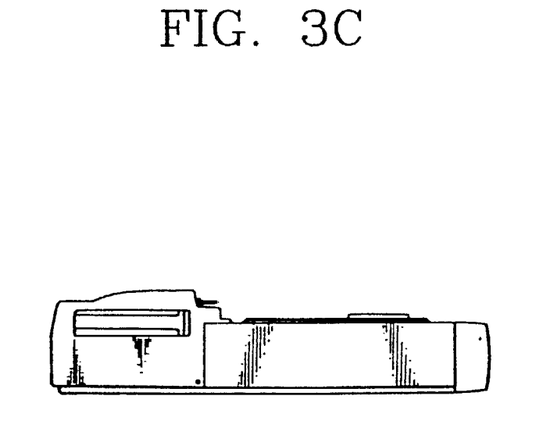
FIG. 3C is a left side view of the docking system of FIG. 2.
Figure 3D:
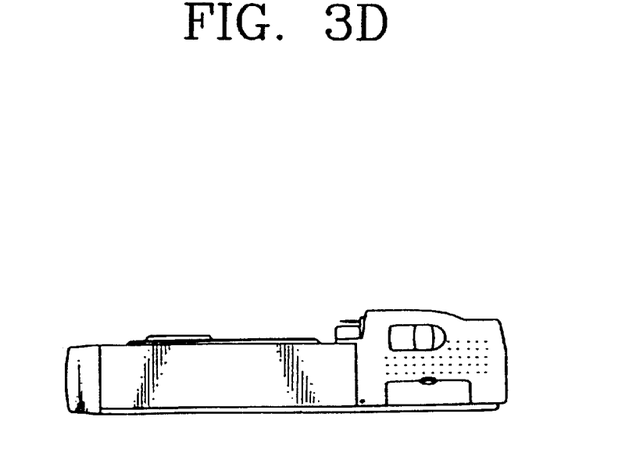
FIG. 3D is a right side view of the docking system of FIG. 2.
Figure 4:
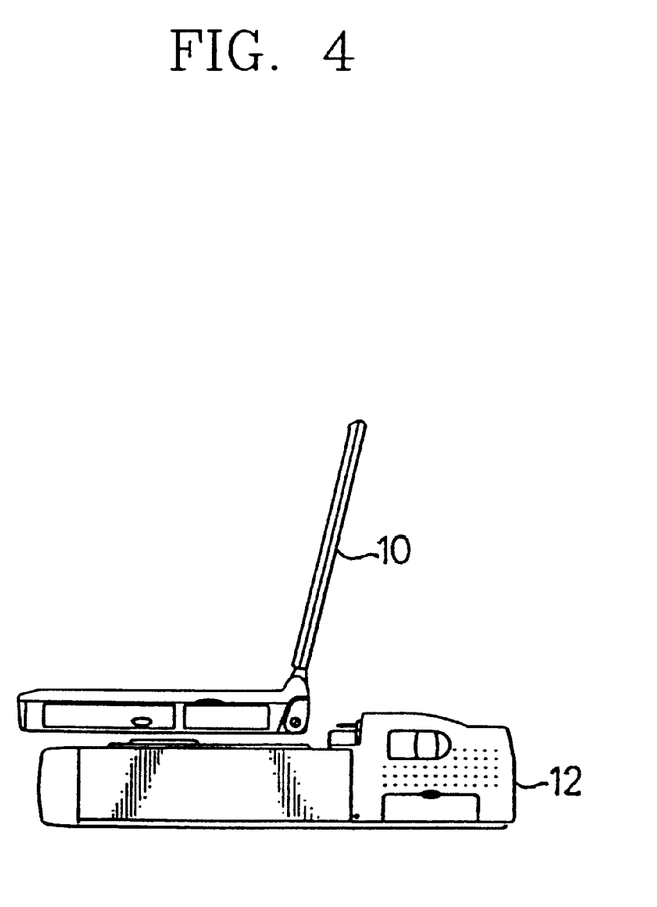
FIG. 4 shows the notebook computer of FIG. 1 docked to the docking system of FIG. 2.

FIG. 1 shows a typical notebook computer 10, FIG. 2 is a perspective view of a typical docking system 12, FIG. 3A is a front view of the docking system 12 of FIG. 2, FIG. 3B is a rear view of the docking system 12 of FIG. 2, FIG. 3C is a left side view of the docking system 12 of FIG. 2, and FIG. 3D is a right side view of the docking system 12 of FIG. 2. FIG. 4 shows the notebook computer 10 of FIG. 1 docked to the docking system 12 of FIG. 2.

Figure 5:
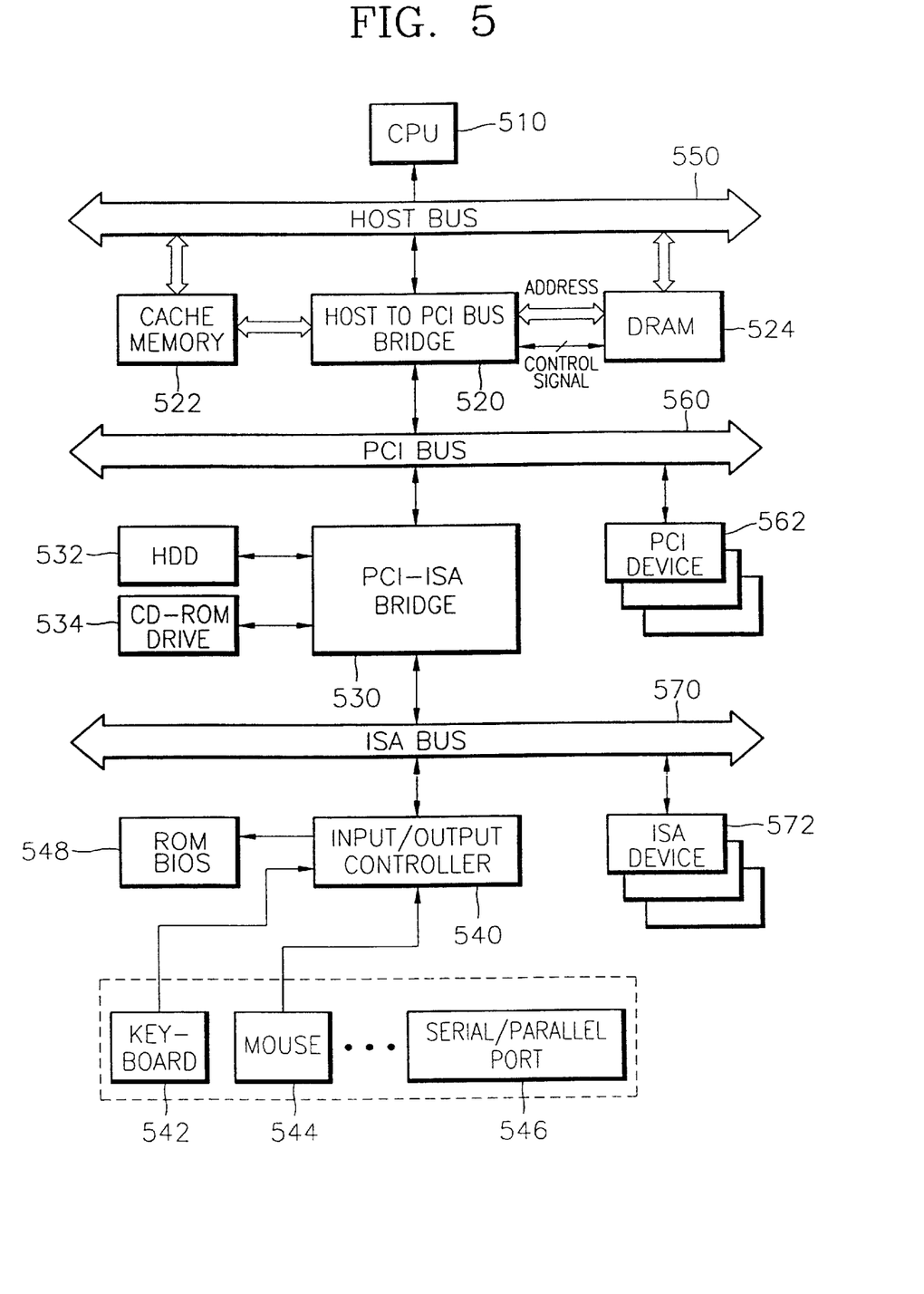
FIG. 5 is a block diagram of the inner structure of a typical notebook computer.

FIG. 5 is a block diagram showing the inner structure of the typical notebook computer 10.

Referring to FIG. 5, a host to peripheral component interconnect (PCI) bus bridge 520 functions as a bridge connecting a host bus 550 supplying a transfer path to a central processing unit (CPU) 210 to a PCI bus 560 supplying a transfer path to PCI devices, and controls a cache memory 522 and a dynamic random access memory (DRAM) 524.

A PCI-ISA (industry standard architecture) bridge 530 functions as a bridge connecting a PCI bus 560 to an ISA bus 570 for ISA devices 572, and integrated device electronics (IDE) controller for controlling IDE devices such as a hard disk drive (HDD) 532 or a CD-ROM drive 534.

An input and output controller 540 is connected to an input unit as a micro computer (MICOM) including a keyboard 542, a mouse 544 and a serial/parallel port 546 and a ROM-BIOS 548, and to the PCI-ISA bridge 530 through an ISA bus 570.

Meanwhile, the power supply of the notebook computer may be used as the power supply of a docking system having a small-capacitance and a simple structure, however, an external AC power supply is used to supply power to the docking system having a large-capacitance and a complicated structure.

Figure 6:
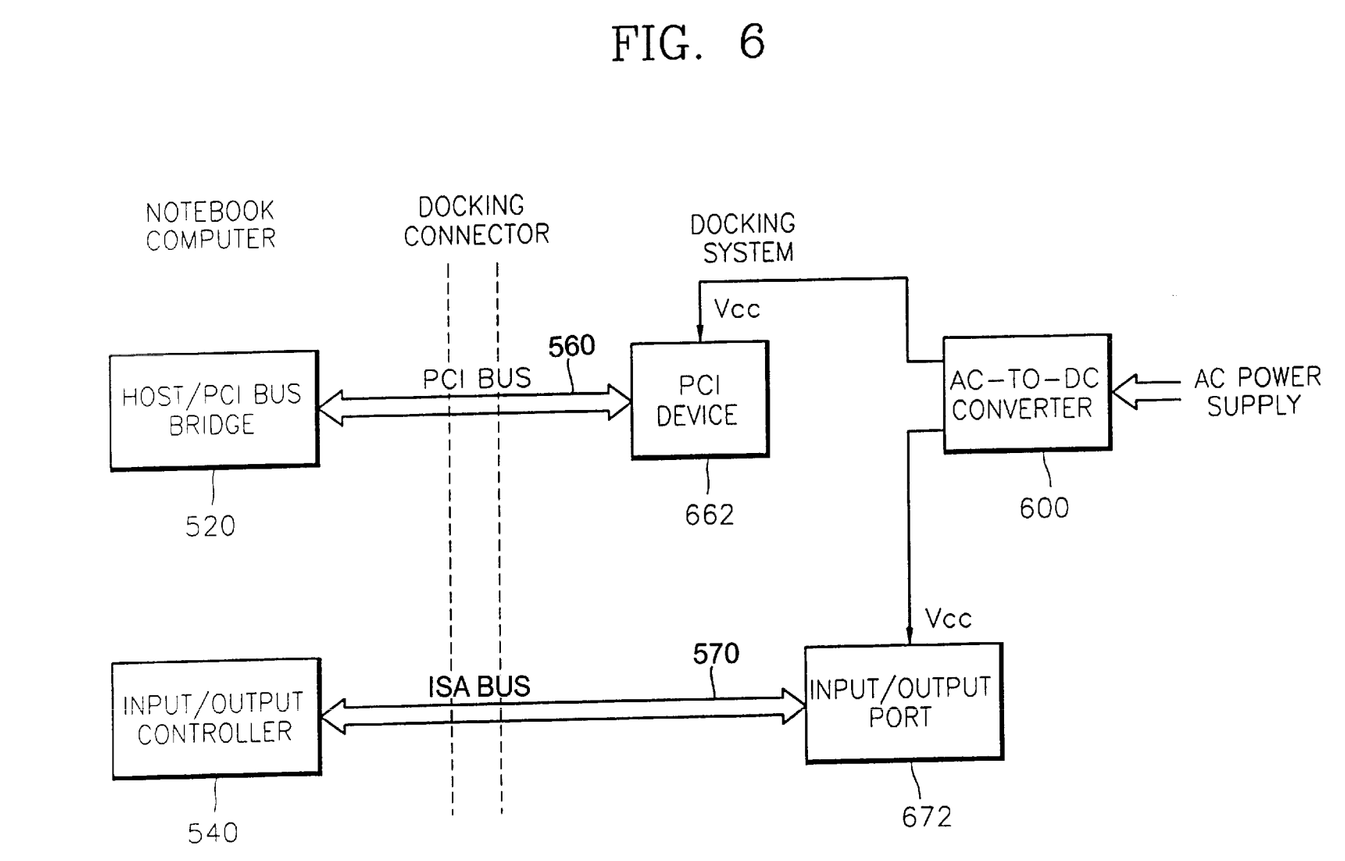
FIG. 6 is a block diagram of the inner structure of an earlier docking system.

Referring to FIG. 6, a notebook computer and a docking system are connected to each other through a docking connector. That is, the host to the PCI bus bridge 520 of the notebook computer is connected to PCI devices 662 of the docking system through a PCI bus connected by a docking connector. Also, the input and output controller 540 of the notebook computer is connected to input and output ports 672 of the docking system, e.g., a serial input and output port, a parallel input and output port and a cathode ray tube screen output device port, through lines connected by a docking connector. Meanwhile, an AC-to-DC converter 600 converts an additional AC power supply not from the notebook computer but an external source to an appropriate DC power and supplies the converted power to the PCI devices 662 and the input and output ports 672.

By an earlier docking system of FIG. 6, when power supply to the docking system docked to the notebook computer is interrupted, the devices connected to the PCI bus does not operate so that the notebook computer is powered down. At this time, leakage current flows into the docking system to thereby damage the docking system devices.

Figure 7:
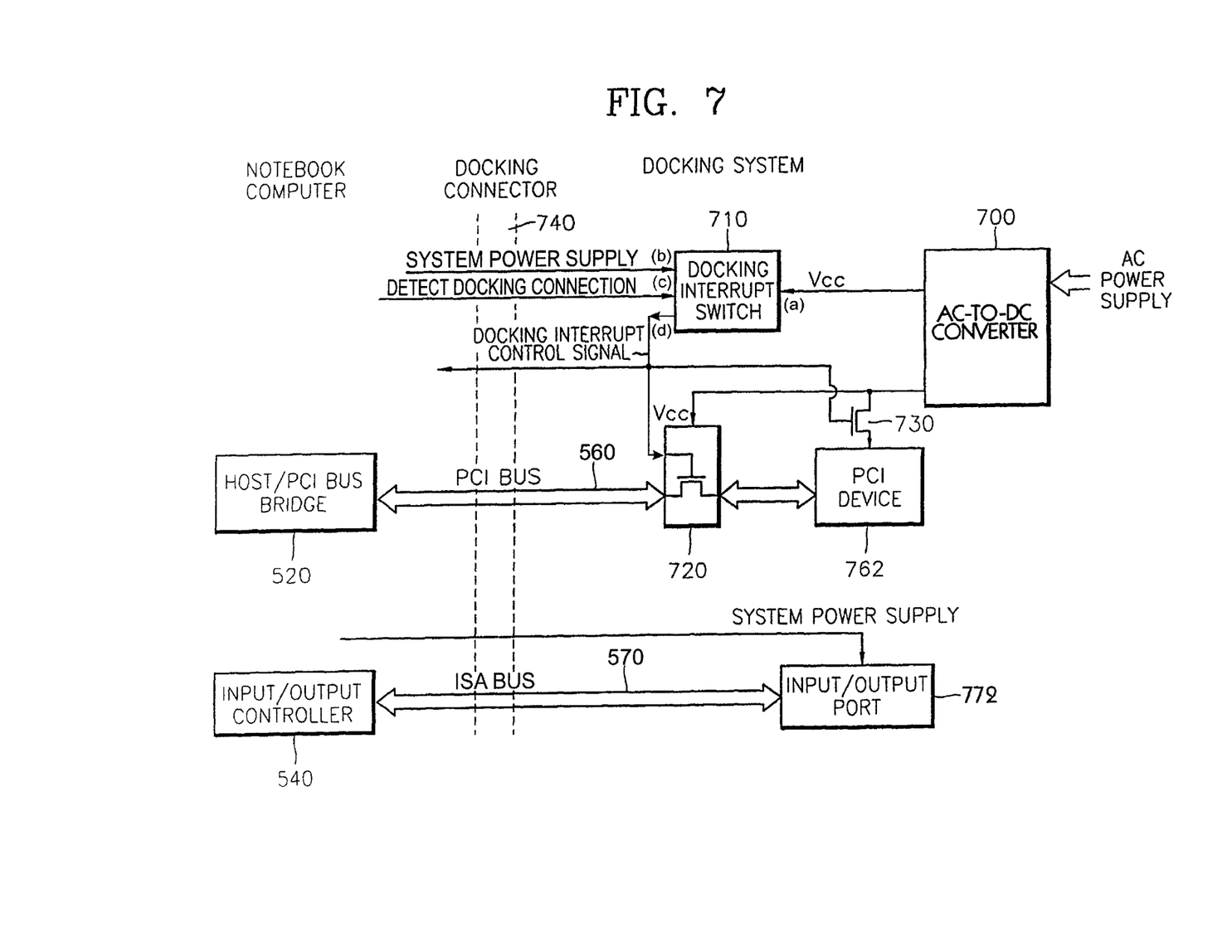
FIG. 7 is a block diagram of the inner structure of a docking system according to an embodiment of the present invention.

Referring to FIG. 7, the power supply of a docking system according to an embodiment of the present invention includes an AC-to-DC converter 700, a docking interrupt switch 710, an analog switch 720 and a docking power supply control switch 730.

The AC-to-DC converter 700 receives an external AC power supply and converts the received AC power supply to a DC power supply, and includes an AC-to-DC conversion adaptor converting the AC power supply to a DC power supply and a DC-to-DC converter converting the DC power supply converted by the AC-to-DC conversion adaptor to a DC power supply appropriate for various devices of the docking system.

The docking interrupt switch 710 includes a first input terminal receiving power from the AC-to-DC converter 700, a second input terminal receiving a power from the notebook computer, a third input terminal detecting docking connection of the notebook computer and the docking system, and a first output terminal outputting a docking interrupt control signal. The docking interrupt switch 710 generates a docking interrupt control signal when no power is supplied to the first input terminal or the second input terminal, or it is detected through the third input terminal that the docking connection of the notebook computer and the docking system is broken.

The analog switch 720 receives power from the AC-to-DC converter 700, and cuts the connection between the peripheral device controller of the notebook computer and one or more extension peripheral devices of the docking system according to the docking interrupt control signal. According to an embodiment of the present invention, preferably, the analog switch 720 has a propagation delay of 0.5 $\mu$m or less.

The docking power supply control switch 730 stops the supply of power from the AC-to-DC converter 700 to one or more extension peripheral devices in accordance with the control of the docking interrupt control signal. Preferably, the docking power supply control switch 730 uses an electric field effect transistor.

A docking system used for the extension devices of the notebook computer includes one or more extension peripheral devices 762, the AC-to-DC converter 700, the docking interrupt switch 710, the analog switch 720, the docking power supply control switch 730, and a docking connector 740.

The docking connector 740 connects or separates a power supply line receiving power and a bus connecting peripheral device controller of the notebook computer and one or more extension peripheral devices. According to an embodiment of the present invention, preferably, the peripheral device controller is a host to PCI bus bridge 520, and the extension peripheral device is a PCI device 762. Thus, the docking connector 740 connects or separates the PCI bus installed in a notebook and the PCI bus installed in the docking system.

According to FIG. 7, the docking system used as the extension device of the notebook computer receives power from the notebook computer, and may further include one or more input/output ports 772 operated by the control of the input and output controller 540 of the notebook computer. Also, the docking connector 740 may further connect or separate lines connecting the input/output controller 540 of the notebook computer and one or more input/output ports 772 and connect or separate a docking interrupt control line supplying the docking interrupt control signal generated by the docking interrupt system 710 to the notebook computer. The notebook computer detects the docking interrupt control signal supplied through the docking connector 740, and checks whether the extension peripheral devices connected to the PCI bus are operating.

Figure 8:
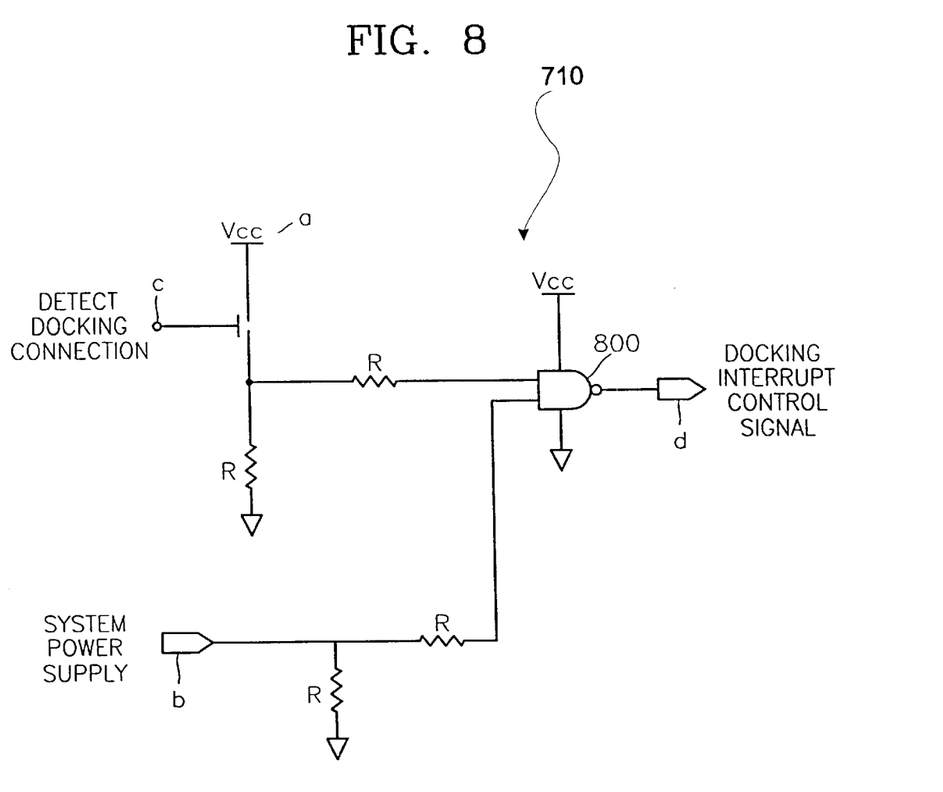
FIG. 8 is a detailed circuit diagram of a docking interrupt switch of FIG. 7.

According to FIG. 8, the docking interrupt switch according to an embodiment of the present invention includes a first input terminal (a) receiving power from the AC-to-DC converter 700, a second input terminal (b) receiving power from the notebook computer, a third input terminal (c) detecting docking connection of the notebook computer and the docking system, and a first output terminal (d) outputting a docking interrupt control signal. As shown in FIG. 8, the docking interrupt switch 710 generates the docking interrupt control signal according to a NAND gate 800 when no power is supplied to the first or the second input terminal, or it is detected through a third input terminal that the docking connection of the notebook computer and the docking system is broken.

During operation, the docking interrupt switch 710 enables the analog switch 720 when docking of the notebook computer and the docking system is completely performed, external AC power is supplied to the docking system, and the system power of the notebook computer is supplied to the docking system. At this time, DC power of the AC-to-DC converter 700 is supplied to PCI device(s) 762. Thus, even though external AC power is no longer supplied to the docking system, or docking of the notebook computer and the docking system is released, no leakage current passes through the PCI bus in the docking system, so that devices in the docking system are protected. Meanwhile, system power of the notebook computer is used to supply power required for the input and output ports 772, so that even though external AC power is no longer supplied to the docking system, the docking system functions as a port replicator with respect to the notebook computer.

Figure 9:
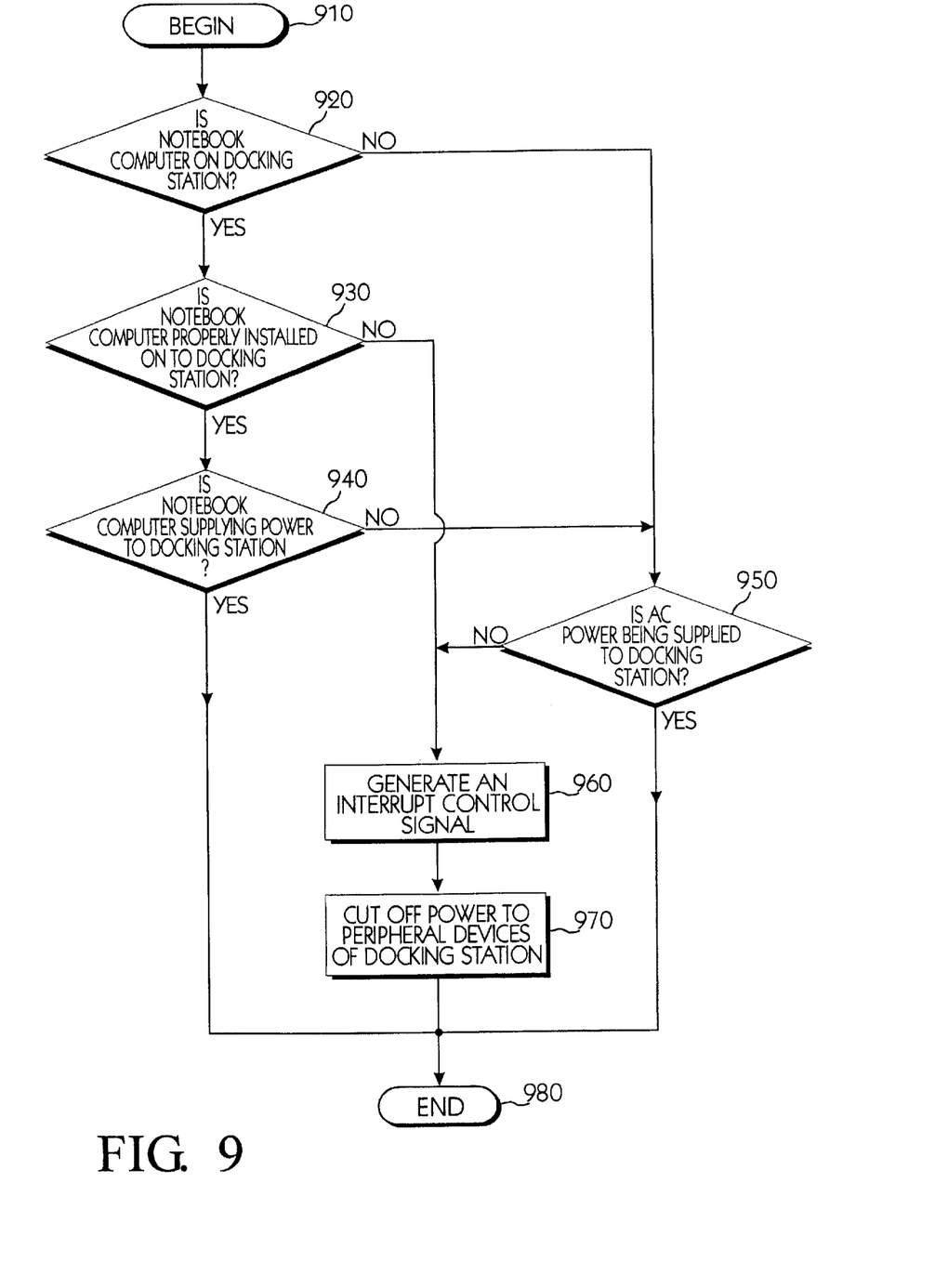
FIG. 9 is a flow chart showing the sequence of determinations and events used in protecting peripheral units of a docking station from damage according to the principles of the present invention.

FIG. 9 is a flow chart showing the sequence of determinations and events used in protecting peripheral units of a docking station from damage according to the principles of the present invention. In step 910, the process begins, in step 920, it is determined if the notebook computer is docked onto the docking station. If the notebook computer is docked onto the docking station, it is determined in step 930 if the electrical connection between the docking station and the notebook computer is electrically perfect. In step 940, it is determined if the docked notebook computer is supplying power to the docking station. In step 950, it is determined if AC power is being delivered to the docking station. If either 1) the notebook computer is improperly docked to the docking station, or 2) no AC power is being supplied to the docking station and the notebook computer is not supplying power to the docking station, then 3) steps 960 and 970 are carried out. Steps 960 and 970 generate an interrupt control signal and cut off power to peripherals of the docking station, respectively, under the above outlined conditions.

In the docking system having an AC power supply, except for the power supplied to the notebook computer, even when power is no being longer supplied or docking of the notebook computer and the docking system is released, the notebook computer or the docking system is not damaged.

Even though external AC power is no longer supplied to the docking system, the docking system can function as a port replicator with respect to the notebook computer.

Even though docking of the notebook computer and the docking system is released, the notebook computer detects a docking interrupt control signal and controls the configuration of PCI devices operating in the notebook computer, so that the notebook computer operates normally.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer having a docking station that receives a notebook computer, comprising:

an AC-to-DC converter receiving an external AC power supply to convert the received AC power into a DC power supply;

a docking interrupt switch generating a docking interrupt control signal when either no more power is supplied from the AC-to-DC converter and no more power is supplied from the notebook computer, or it is determined that docking connection between said notebook computer and said docking station is faulty;

an analog switch receiving power from said AC-to-DC converter, and disconnecting a peripheral device controller of said notebook computer from an extension peripheral device of said docking station depending upon whether said docking interrupt control signal is generated; and a docking power supply control switch cutting off power of the AC-to-DC converter supplied to the said extension peripheral device when said docking interrupt control signal is generated.

2. The computer of claim 1, wherein the docking power supply control switch is an electric field effect transistor.

3. The computer of claim 1, said extension peripheral device being either an external monitor, a full-sized keyboard, a pair of speakers, a compact disk read only memory drive, a hard disk drive, a printer, or a port connector.

4. The computer of claim 1, said docking supply control switch cutting off only power supplied to the extension peripheral device in said docking station and not cutting off power supplied to the notebook computer when the docking interrupt control signal is generated.

5. A computer having a docking station that receives a notebook computer, comprising:

a plurality of extension peripheral devices in said docking station;

an AC-to-DC converter located in said docking station receiving an external AC power supply to convert the received AC power supply to a DC power supply for said notebook computer;

a docking interrupt switch generating a docking interrupt control signal when either no more power is supplied from the AC-to-DC converter and no more power is supplied from the notebook computer, or it is determined that docking connection between said notebook computer and said docking station is imperfect;

an analog switch receiving power from the AC-to-DC converter, and disconnecting a peripheral device controller of said notebook computer from said plurality of extension peripheral devices of said docking station depending upon whether said docking interrupt control signal is generated;

a docking power supply control switch cutting off power of the AC-to-DC converter supplied to the said plurality of extension peripheral devices when said docking interrupt control signal is generated; and a docking connector selectively electrically connecting and separating said notebook computer to or from said docking station.

6. The computer of claim 5, said docking connector selectively connecting and separating a bus connecting a peripheral device controller of said notebook computer to said plurality of extension peripheral devices of said docking station.

7. The computer of claim 6, said docking connector selectively connecting and separating a power supply line for delivering power to said docking station from said notebook computer when said notebook computer is correctly electrically connected to said docking station.

8. The computer of claim 7, said bus being a peripheral component interconnect (PCI) bus and said peripheral device controller of said notebook computer is a host to a PCI bus bridge, and said plurality of extension peripheral devices in said docking station depend on the PCI standard.

9. The computer of claim 7, said docking connector further connects or separates a docking interrupt control line supplying said docking interrupt control signal generated by said docking interrupt switch of said docking station to said notebook computer.

10. The computer of claim 9, said plurality extension peripheral devices include an external monitor, a full-sized keyboard, a pair of speakers, a compact disk read only memory drive, a hard disk drive, a printer, or a port connector.

11. The computer of claim 5, further comprising an input/output port in said docking station operated by receiving power from said notebook computer, wherein said docking connector connects or separates lines connecting an input/output controller of the notebook computer to or from said input/output port of said docking station.

12. The computer of claim 5, said docking supply control switch cutting off only power supplied to the plurality of extension peripheral devices in said docking station and not cutting off power supplied to the notebook computer when the docking interrupt control signal is generated.

13. A method of protecting a plurality of peripheral devices inside a docking station of a computer from power glitches, comprising the steps of:

providing a notebook computer that connects to said docking station;

providing an AC to DC power converter inside said docking station;

determining whether power is being supplied to said docking station from an AC power supply;

determining whether said notebook computer is docked onto said docking station;

determining whether said notebook computer is correctly installed onto said docking station if said notebook computer is docked onto said docking station;

determining if said notebook computer can power said docking station if said notebook computer is correctly installed onto said docking station; and cutting power to said plurality of peripheral devices if said notebook computer is not correctly installed onto said docking station or both no AC power is being supplied to said docking station and said notebook computer cannot power said docking station.

14. The method of claim 13, said step of cutting power to said plurality of peripheral devices is preceded by the step of generating an interrupt control signal to send to a docking power supply control switch and an analog switch in said docking station.

15. The method of claim 14, said plurality of peripheral devices comprise an external monitor, a full-sized keyboard, speakers, a compact disk read only memory drive, a hard disk drive, a printer, and port connectors.

16. The method of claim 13, said cutting power step cutting power only to being supplied the plurality of peripheral devices in said docking station while no power is cut off to the notebook computer.

* * * * *